US012677044B2

(12) United States Patent
Shi et al.

(10) Patent No.: US 12,677,044 B2
(45) Date of Patent: *Jul. 7, 2026

(54) MIDROLL BREAKS FEEDBACK SYSTEM

(71) Applicant: GOOGLE LLC, Mountain View, CA (US)

(72) Inventors: Yun Shi, Sunnyvale, CA (US); Jianfeng Yang, Mountain View, CA (US); Ramesh Sarukkai, Los Gatos, CA (US); Zindziswa Lara McCormick, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,652

(22) Filed: Mar. 7, 2024

(65) Prior Publication Data

US 2024/0214647 A1     Jun. 27, 2024

Related U.S. Application Data

(63) Continuation of application No. 17/833,887, filed on Jun. 6, 2022, now Pat. No. 11,949,961, which is a (Continued)

(51) Int. Cl.
*G06Q 30/00*          (2023.01)
*H04N 21/234*          (2011.01)
(Continued)

(52) U.S. Cl.
CPC ..... *H04N 21/812* (2013.01); *H04N 21/23424* (2013.01); *H04N 21/2407* (2013.01); *H04N 21/4532* (2013.01); *H04N 21/4755* (2013.01)

(58) Field of Classification Search
None
See application file for complete search history.

(56) References Cited

U.S. PATENT DOCUMENTS 7,826,911 B1 * 11/2010 Bennett ................. G06F 16/686
84/600
9,361,353 B1 * 6/2016 Aristides ............... G06F 16/735
(Continued)

FOREIGN PATENT DOCUMENTS

WO     WO-2008056358 A2     5/2008

OTHER PUBLICATIONS

Audio Processing and Loudness Estimation Algorithms with iOS Simulations, Author: Kalyanasundaram, Girish, Publication info: Arizona State University. ProQuest Dissertations Publishing, 2013. (Year: 2013).*

(Continued)

*Primary Examiner* — Matthew T Sittner
(74) *Attorney, Agent, or Firm* — MARSHALL, GERSTEIN & BORUN LLP

(57)          ABSTRACT

A computer-implemented method for optimizing the placement of previously selected breaks in a media item is provided herein. Embodiments of the method include steps of identifying a break in a media item, the break being associated with a first break point at a first time during playback of the media item. The method may also include steps of dynamically adjusting the placement of the breaks within the media item based on the performance of the media item.

14 Claims, 5 Drawing Sheets

Related U.S. Application Data continuation of application No. 17/104,453, filed on Nov. 25, 2020, now Pat. No. 11,356,745, which is a continuation of application No. 15/959,155, filed on Apr. 20, 2018, now Pat. No. 10,856,053, which is a continuation-in-part of application No. 14/333,380, filed on Jul. 16, 2014, now abandoned.

(51) Int. Cl.

| | |
|---|---|
| *H04N 21/24* | (2011.01) |
| *H04N 21/45* | (2011.01) |
| *H04N 21/475* | (2011.01) |
| *H04N 21/81* | (2011.01) |

(56) References Cited

U.S. PATENT DOCUMENTS

| | | | |
|---|---|---|---|
| 10,097,605 | B2 | 10/2018 | Lewis et al. |
| 2004/0158865 | A1 | 8/2004 | Kubler et al. |
| 2007/0168259 | A1 | 7/2007 | Haberman et al. |
| 2007/0204310 | A1* | 8/2007 | Hua .................... H04N 21/6587 348/E7.071 |
| 2007/0288518 | A1* | 12/2007 | Crigler ................ G06F 16/4387 |
| 2009/0119179 | A1 | 5/2009 | Kolve et al. |
| 2010/0205049 | A1* | 8/2010 | Long .................. G06Q 30/0252 705/14.5 |
| 2011/0047567 | A1* | 2/2011 | Zigmond ........... G06Q 30/0263 725/32 |
| 2011/0191178 | A1* | 8/2011 | Newberg ........... G06Q 30/0277 705/14.73 |
| 2011/0289531 | A1* | 11/2011 | Moonka ................. G11B 27/28 725/38 |
| 2012/0110616 | A1* | 5/2012 | Kilar ...................... G06Q 30/02 725/32 |
| 2012/0166289 | A1* | 6/2012 | Gadoury ............... H04L 65/611 709/219 |
| 2013/0028573 | A1 | 1/2013 | Hoofien et al. |
| 2013/0237318 | A1* | 9/2013 | Colaco .................... A63F 13/00 463/31 |
| 2013/0263182 | A1* | 10/2013 | Ivy ....................... H04N 21/458 725/34 |
| 2013/0298147 | A1* | 11/2013 | Klein et al. |
| 2013/0305273 | A1* | 11/2013 | Hadfield ............ G06Q 30/0246 725/14 |
| 2014/0115631 | A1 | 4/2014 | Mak et al. |
| 2014/0123173 | A1* | 5/2014 | Mak ................... G06Q 30/0249 725/32 |
| 2014/0259048 | A1* | 9/2014 | Brueck ............ H04N 21/23424 725/32 |
| 2014/0304233 | A1* | 10/2014 | Belaunde ................ G06F 16/48 715/764 |
| 2015/0278687 | A1* | 10/2015 | Sculley, II ......... G06Q 30/0255 706/47 |
| 2015/0318018 | A1* | 11/2015 | Kaiser .............. H04N 21/47205 386/241 |

OTHER PUBLICATIONS

Dongle for TV Location Identification and Advertisement Insertion, ip.com Disclosure No. IPCOM000236792D, Publication Date: May 15, 2014. (Year: 2014).*

Methods, systems, and media for presenting content, ip.com Disclosure No. IPCOM000236856D, Publication Date: May 19, 2014. (Year: 2014).*

IP.conn Search Strategy (Year: 2021).

STIC EIC 3600 Search Report for parent U.S. Appl. No. 15/959,155 (similar claims) dated Jul. 23, 2020 (Year: 2020).

STIC EIC 3600 Search Report for U.S. Appl. No. 17/104,453 dated Aug. 27, 2021 (Year: 2021).

IP.conn NPL Search Strategy dated 20210819 (Year: 2021).

Final Office Action on U.S. Appl. No. 14/333,380 dated Jan. 22, 2018 (16 pages).

Final Office Action on U.S. Appl. No. 15/959,155 dated Jan. 10, 2020 (20 pages).

Non-Final Office Action on U.S. Appl. No. 14/333,380 dated Jun. 13, 2017 (18 pages).

Non-Final Office Action on U.S. Appl. No. 15/959,155 dated Sep. 17, 2019 (19 pages).

Notice of Allowance on U.S. Appl. No. 15/959,155 dated Jul. 31, 2020 (12 pages).

* cited by examiner

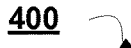

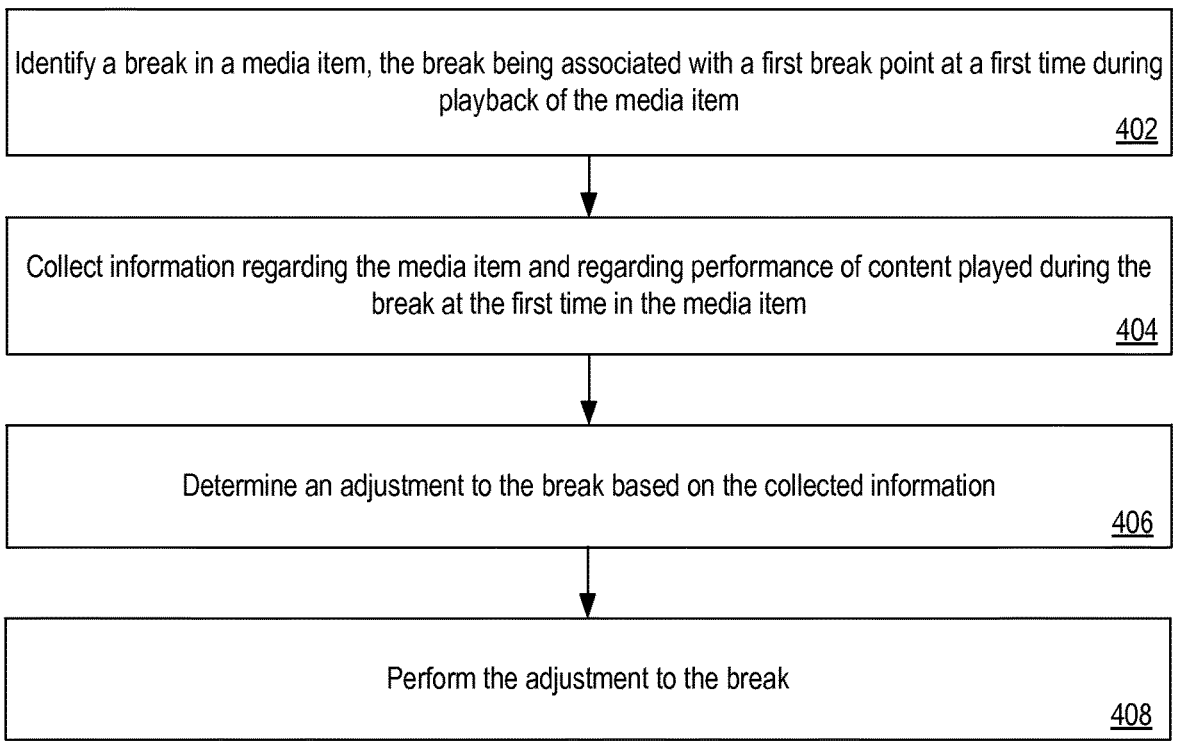

Identify a break in a media item, the break being associated with a first break point at a first time during playback of the media item

402

Collect information regarding the media item and regarding performance of content played during the break at the first time in the media item

404

Determine an adjustment to the break based on the collected information

406

Perform the adjustment to the break

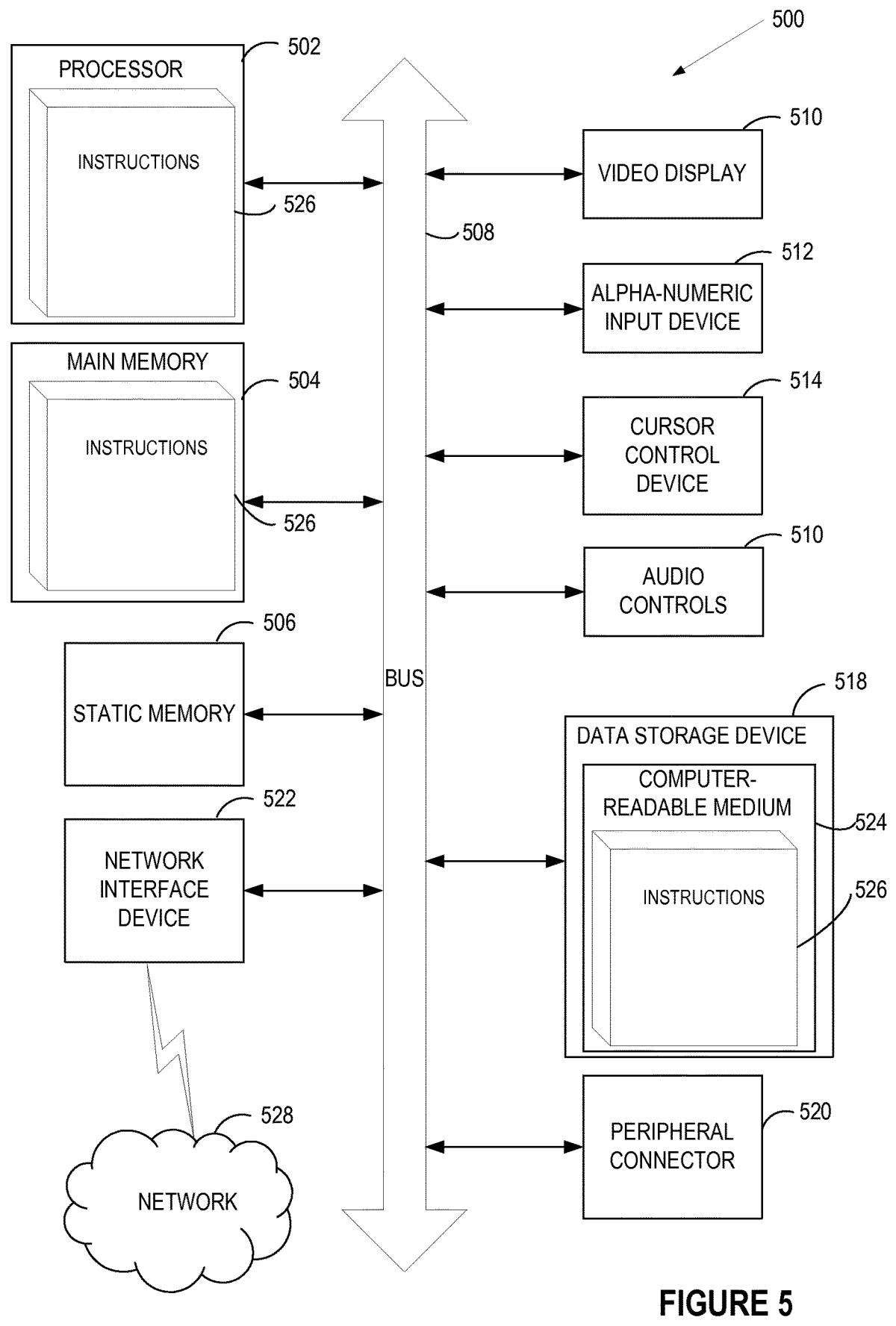

PROCESSOR

INSTRUCTIONS

526

510

VIDEO DISPLAY

508

512

ALPHA-NUMERIC
INPUT DEVICE

MAIN MEMORY

504

INSTRUCTIONS

526

514

CURSOR
CONTROL
DEVICE

510

AUDIO
CONTROLS

506

STATIC MEMORY

BUS

518

DATA STORAGE DEVICE

COMPUTER-
READABLE MEDIUM

524

INSTRUCTIONS

526

522

NETWORK
INTERFACE
DEVICE

528

NETWORK

520

PERIPHERAL
CONNECTOR

FIGURE 5

MIDROLL BREAKS FEEDBACK SYSTEM

CROSS-REFERENCE TO RELATED APPLICATIONS

This application is a continuation of U.S. patent application Ser. No. 17/833,887, filed Jun. 6, 2022, which is a continuation of U.S. patent application Ser. No. 17/104,453 (now U.S. Pat. No. 11,356,745), filed Nov. 25, 2020, which is a continuation of U.S. patent application Ser. No. 15/959, 155 (now U.S. Pat. No. 10,856,053), filed Apr. 20, 2018, which is a continuation in part of U.S. patent application Ser. No. 14/333,380, filed Jul. 16, 2014, the entireties of which are incorporated by reference herein.

TECHNICAL FIELD

This disclosure relates to the field of content-sharing platforms and, in particular, to methods and systems for inserting midroll content into the presentation of primary media item.

BACKGROUND

On the Internet, content-sharing platforms and content-distribution platforms, like social networks, subscription media services, and others, allow users to consume a variety of media item and may allow users to connect to and share information and media items with each other. Many social networks include a content-sharing aspect that allows users to upload, view, and share content, such as video content, image content, audio content, and so on (which may be referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing and distribution platforms to use, play, share, and/or consume media items (e.g., watch digital videos, and/or listen to digital music).

Because so many different types of media items may be available to users of a given content platform, such a platform may have a variety of uses and a variety of opportunities to incorporate secondary content items. Midroll content items (e.g., content items that "interrupt" a primary media item), may be used to generate revenue from longer media items. For example, a platform may include midroll content items at one or more breaks in media items that are longer than 10 minutes. To date, systems and methods for inserting midroll content item and other midroll content into media items have not been entirely satisfactory.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a computer-implemented method of optimizing the placement of previously-selected break points in a media item is provided herein. Embodiments of the method include steps of identifying a break in a media item, the break being associated with a first break point at a first time during playback of the media item. The method may also include steps of collecting information regarding the media item and performance of content played during the break at the first time and of determining an adjustment to the break based on the collected information.

In additional implementations or embodiments, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the disclosure, a non-transitory computer-readable storage medium stores instructions for performing the operations of the above described implementations.

BRIEF DESCRIPTION OF THE DRAWINGS

Aspects of the present disclosure are illustrated, by way of example and not by way of limitation, in the figures of the accompanying drawings.

FIG. 4 is a flow diagram of a method for incorporating feedback into midroll break placement, in accordance with some embodiments of the disclosure.

FIG. 5 is a block diagram illustrating an exemplary system architecture, according to some embodiments.

Figure 1:
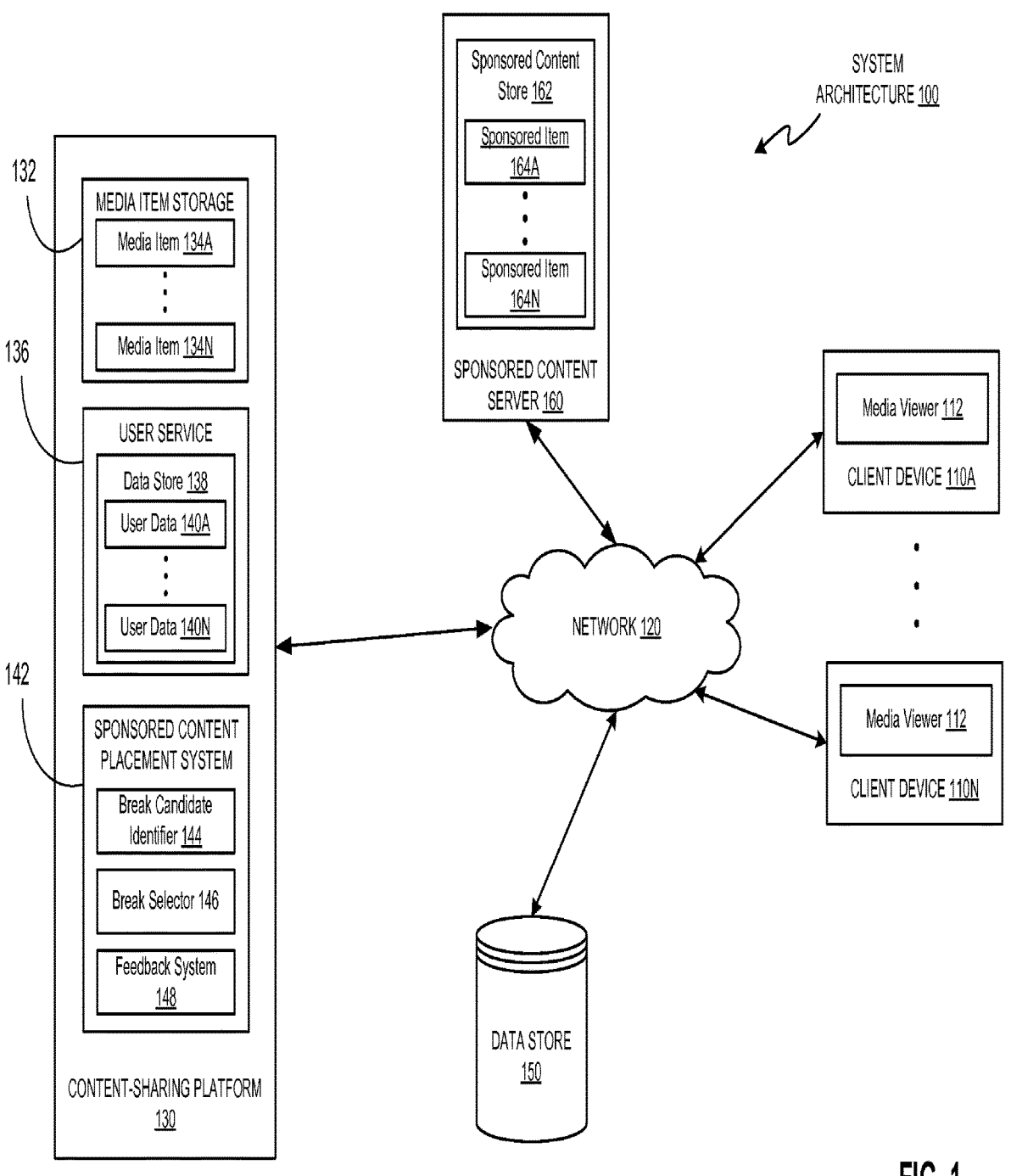
FIG. 1 illustrates an exemplary system architecture for optimizing the placement of a break in a primary media item, in accordance with an embodiment of the disclosure.

These drawing may be better understood when observed in connection with the following Detailed Description.

DETAILED DESCRIPTION

Implementations are described for optimizing the dynamic placement of breaks for midroll content during the presentation of a primary media item on an Internet-based media platform. Internet-based media platforms have become increasingly important channels for the distribution and consumption of media content such as movies, television, videos, music, photography, and text. As more media distribution has migrated onto such platforms, the amount of content available has increased dramatically. These Internet-based media platforms may include platforms that permit ordinary users to upload media items (referred to herein as content-sharing platforms) and platforms in which ordinary users merely consume media items (referred to herein as content-distribution or content-presentation platforms). Content-sharing platforms may insert midroll or other breaks in the media items. Improper placement of the breaks in the media item can result in wasted computational and network resources because the break location can impact the performance of the media item. Break placement that impacts the performance of the media item can result in wasted resources when the media item is transmitted over a network to client devices that do not continue to view or download the media item after the break. Improper placement of the break in the media item can result in client devices abandoning the download the media item, which wastes network resources and network bandwidth. The present solution can enable the selection and dynamic placement of breaks from a plurality of possible candidate break points. Dynamically selecting and placing breaks based on the plurality of candidate break points can reduce the number of abandoned downloads and reduce the of bandwidth that is wasted through the abandonment of downloads.

While the examples of this disclosure are expressed as being directed to a content-sharing platform, the principles and scope are applicable in other media platforms (e.g., Internet-based, smart TV, game console, etc.) as well.

Content-sharing platforms may include various categories of media items, which may in turn include various subcategories of media items. For example, media items that may be consumed via a content-sharing platform may include short media items lasting only several seconds, medium length media items having a duration from about ten minutes to about a half an hour, and long media items may have a duration greater than about a half an hour. For example, full-length or feature-length media items may last more than an hour.

In some embodiments, media items under a threshold length (e.g., twenty minutes or ten minutes) may be able to include preroll and/or postroll content. Media items that are longer than the threshold length may also be able to include midroll content. This distinction may be implemented by the content-sharing platform on the reasoning that excessive interruption during the viewing of a media item may reduce media item performance and can discourage the user from finishing that media item. The system can place media item breaks based on the duration of the media item. For example, if a user is presented with three breaks in a seven-minute media item, the user may become frustrated, while three breaks during a media item that is a half an hour in length may not bother the user. For this reason, content-sharing platforms may place limits on the concatenation or insertion of secondary content, such as sponsored content.

When media items are uploaded to a content-sharing platform, given the volume of content that may be uploaded, one or more breaks can be placed randomly or may be placed at specific times during the presentation of the uploaded media item (e.g., at 15 minutes, at 30 minutes, and at 45 minutes into the media item) without regard to the content of the media item. Such improper placement of breaks can reduce the media item performance and can degrade the viewing experience for users of the content-sharing platform.

The present solution can use, for example, machine learning, to automatically and dynamically identify one or more candidate break points in a media item based on features of that media item. For example, a break point candidate detection system may scan through the video frames of a media item to determine when a scene change occurs. Similarly, the break point candidate detection system may scan the audio of a media item to detect a break in dialogue that may indicate a scene change or another potential break point, at which the presentation of sponsored content may be better reviewed by the consuming users. In addition to only selecting break points based on the features of the media items, the present solution can also select the break points based on the performance of the media item, which can provide an improvement over setting break points at predetermined intervals or based only on the content of the media item itself.

Additionally, after one or more break point candidates are chosen as breaks, the present solution can enable the dynamic adjustment and repositioning of the breaks in a media item. In particular, data may be collected about the number of client devices that abandon downloads of the media items. Based on the number of client devices that abandon the downloads of the media items, the system can generate retention rates that are dependent on the location of the breaks in the media items. By collecting information regarding the presentation of the media item (e.g., total views), information regarding the media item, and information regarding the content inserted at the breaks and analyzing the information, dynamic adjustment in the placement of the breaks can be made for subsequent instances of the media item. For example, by moving one break from a first break point at a first time to another break point at another time, the system can reduce the number of abandoned downloads. This may result in an improved viewing experience for users and the reduction of wasted network resources as fewer downloads are abandoned. The present solution can also enable the selection of break points, the optimization of break points, and the customization of break points for a large number of number of client devices based on features of the client devices and the media items. For example, rather than selecting a break point for all client devices, the system can dynamically select and place break points in media items at different locations for different types of client devices. The system can automatically perform the adjustment to break point locations. In some embodiments, the adjustment may be a selection of a different break point from a set of candidate break points. In other embodiments, the adjustment may be the removal of the break point.

Accordingly, the system can improve the performance of the content-sharing platform by reducing the rates of abandonment of the media items.

FIG. 1 illustrates an exemplary system architecture 100 for the sharing, distributing, and presenting of media items, in accordance with an embodiment of the disclosure. The system architecture 100 includes a plurality of client devices, illustrated as client devices 110A through 110N. The system architecture 100 further includes a network 120, a content-sharing platform 130, a data store 150, and a sponsored content server 160. In some embodiments, these features may operate to provide optimized break placement for midroll content played during a media item requested by a user of the content-sharing platform 130.

In one embodiment, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 150 includes a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center. Thus, in some embodiments, the data store 150 may be a data center.

The client devices 110A-N may each include computing devices such as personal computers (PCs), laptops, mobile phones, smartphones, tablet computers, wearable computing devices, etc. Client devices 110A-N may be used to consume (e.g., view, hear, etc.) content and upload content to the content-sharing platform 130. In some instances herein, client devices 110A-N may also be referred to as "user devices." Each client device includes a media viewer 112. In one embodiment, the media viewers 112 may be applications that allow users to receive media items including visible content, such as images, videos, web pages, documents, etc., and/or audio content such as live audio and sound and music recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) on the client device to a user consuming the content. The media viewer 112 may also display an embedded media player (e.g., a Flash® player or an HTML5 player) that is embedded in a web page (e.g., a web page that may provide information about a product sold by an online merchant, a content-sharing platform such as a social network). The media viewer 112 may also render or present audio components of the content on a sound system of a client device, including an internal speaker of the client device 110A or an external speaker coupled to the client device 110A by an audio system connection.

In another example, the media viewer 112 may be a standalone application, such as smartphone application or "app," that allows users to consume digital media items (e.g., digital videos, digital images, electronic books, shared text, etc.) as part of the content-sharing platform 130. Additionally, the media viewer 112 may provide a user interface, or receive a data including a user interface from the content-sharing platform 130 to enable content-owning users to upload and manage content. Managing content may include selecting one or more break points from among a set of candidate break points identified by the content-sharing system 130.

The media viewers 112 may be provided to the client devices 110A-N by the content-sharing platform 130 and/or a third-party distribution platform, such as an app distribution platform. For example, the media viewers 112 may be embedded media players that are embedded in web pages provided by the content-sharing platform 130 over the network 120 to the client devices 110A-N. In another example, the media viewers 112 may be applications that are downloaded from a server accessible to the client devices 110A-N through the network 120 and then executed by a processing device of the client devices 110A-N.

In general, functions described in one embodiment as being performed by the content-sharing platform 130 can also be performed on the client devices 110A-N in other embodiments if appropriate. Thus, the functionality attributed to a particular component of the system architecture 100 may be performed by different or multiple components operating together or by the particular component alone. The content-sharing platform 130 can also be accessed as a service provided to other systems or devices through appropriate application programming interfaces (APIs), and thus is not limited to use in websites or particular applications.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a mobile computing application (e.g., an "app") that may be used to provide a user with access to the media items. Additionally, the content-sharing platform 130 may enable a user to management uploaded media items. This management may include the selection of various options regarding the inclusion of sponsored items at breaks in the presentation of the uploaded media items, including the frequency and placement of breaks and the types of sponsored items. The content-sharing platform 130 may also provide information to content-owning users regarding the performance of their uploaded media items and regarding the performance of sponsored items presented in connection with their uploaded media items. Such information may include audience retention rates in numeric or graphical representation, total media item views, total sponsored item views, and other information as is described herein.

The content-sharing platform 130 may include a media item storage 132 that includes a plurality of media items 134A-N. Examples of media items 134A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. As used herein, "media," media item," "online media item," "digital media," "digital media item," "content," and "content item" can include and refer to an electronic file that can be executed, loaded, or played using software, firmware, or hardware configured to present the digital media item to a viewing user of the content-sharing platform 130.

The content-sharing platform 130 may further include a user service 136. The user service 136 may include a data store 138 including instances of user data 140A-N. The user data 140A-N may include databases and/or table of information about or associated with users of the content-sharing platform, individually and/or collectively. The user service 136 may include consumption histories and/or playlists for the users of the content-sharing platform 130 and may include interactions, such as approvals, disapprovals, comments, etc., that the users have had with one or more of media items 134A-N. Additionally, the user service 136 may include a list of media items uploaded by the user or otherwise owned or claimed by the user. For example, if one user uploads a video that includes copyrighted music, a user that owns the copyrighted music may claim the copyrighted music within the content-sharing platform 130 without requesting that the video be taken down or removed from the content-sharing platform 130. The user service 136 may then associated the audio portion of that uploaded video with the copyright-owning user. This may enable the copyright-owning user to receive information regarding the performance of the video and, in some embodiments, may also enable the copyright-owning user to manage the inclusion of sponsored items in the presentation of the video. Thus, the user service 136 may include information regarding users as consumers of the content-sharing platform 130 and information regarding users as owners of content being shared or distributed through the content-sharing platform 130.

In some embodiments, the content-sharing platform 130 may store the media items 134A-N using the data store 150. In such embodiments, the media items 134A-N may be pointers to corresponding media items as stored in the data store 150. The media items 134A-N may be retrieved from data store 150 prior to delivery to one or more of client devices 110A-N over network 120. Pointers may be included in the user data 140A-N as part of a user's consumption history, or owned media item list, or another identifier may be used to indicate that a particular user has consumed a particular media item and/or owns the particular media item.

As illustrated in FIG. 1, the content-sharing platform 130 further includes the sponsored content placement system 142. The sponsored content placement system 142 may aid content-owning users in placing breaks for the inclusion of midroll content in the presentation of owned media items. Such midroll content may include a sponsored media item from the sponsored content server 160, which is discussed in greater detail below. As described herein, a user that "owns" a media item may be an individual or a legal entity having intellectual property embodied in the media item or the user may be an agent of such an individual or legal entity. The user service 136 may determine whether a user owns a media item, such that the user should be permitted access to the sponsored content placement system 142 to manage the inclusion of sponsored items in one or more breaks during the presentation of the media item to users of the content-sharing platform 130.

The sponsored content placement system 142 may include several components or subsystems to identify candidate break points in a media item, to automatically select a subset of the candidate break points as breaks or to provide manual control to a user in the selection of breaks from the subset of candidate break points, and to collect or receive information regarding the performance of the media item and/or included sponsored items. For example, the sponsored content placement system 142 may provide the plot 200A of FIG. 2A to the user in a user interface.

Figure 2A:
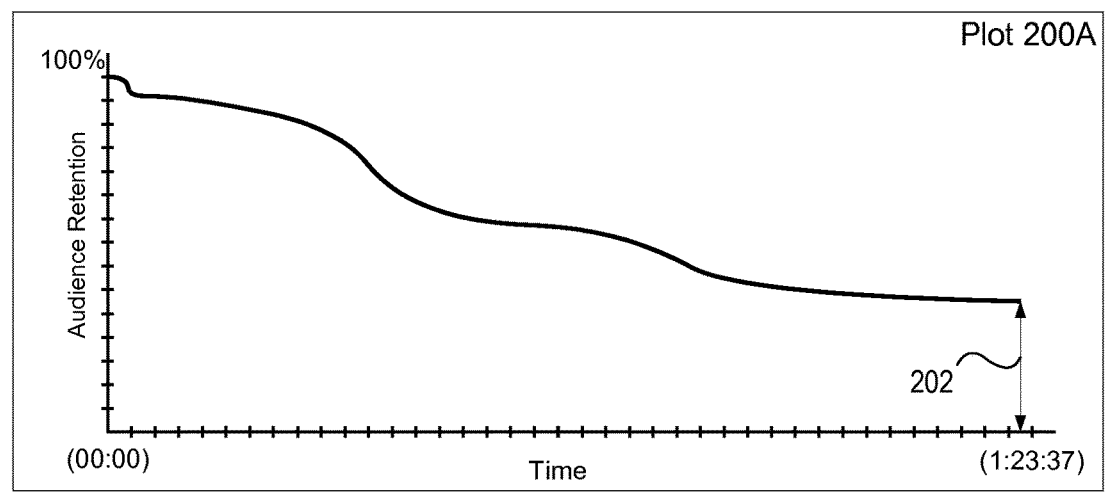
FIG. 2A illustrates an exemplary plot of audience retention values in the absence of midroll content, in accordance with some embodiments of the disclosure.

Referring to FIG. 2A, the plot 200A is an exemplary plot that shows the audience retention values of a media item in graphical format. As may be the case in some circumstances, plot 200A shows that not all of the consuming users that begin playing the media item actually finish the media item. Plot 200A may be useful in indicating areas in the media item in which the audience loses interest and stops watching or otherwise consuming the media item. Plot 200A also depicts an end value 202 of about 37%, meaning that about 37% of the users who begin watching the media item are finishing the media item. This information, provided by the sponsored content placement system 142 to the user, may be used by the user in a variety of ways, some of which are described herein.

Referring again to FIG. 1, the components or subsystems of the sponsored content placement system 142 may also provide that information to users as part of recommendations to adjust the selection of breaks from candidate break points or to automatically adjust the breaks on behalf of the user. As illustrated, the sponsored content placement system 142 includes a break candidate identifier 144. The break candidate identifier 144 may use machine learning algorithms to identify one or more candidate break points in a media item. These candidate break points may be stored in association with the media item. The break candidate identifier 144 may use scene changes, audio changes or breaks, and/or other features of the media item to indicate that a point or time within a media item may be appropriate for the inclusion of midroll content, such that the inclusion of midroll content at a break at that point or time may cause the least disruption to the viewer when consuming the media item. For example, including a break for midroll content in the middle of a car chase scene in an action movie may cause significant disruption. For each break point candidate identified by the break candidate identifier 144, a confidence value may be included. The machine learning algorithms may produce the confidence value during the identification of candidate break points. The higher the confidence value, the stronger the likelihood that the candidate break point is an appropriate location for the inclusion of midroll content.

A break selector 146, illustrated in FIG. 1 as part of the sponsored content placement system 142, may receive the set of identified candidate break points from the break candidate identifier 144. In some embodiments, the break selector 146 may provide a user interface element to present information to a user through a client device 110A to enable the user to manually select or enter breaks. In some embodiments, the user may be presented with the set of candidate break points and select one or more breaks from among them. In yet other embodiments, the break selector 146 may automatically select one or more breaks from among the set of identified candidates. For example, the break selector 146 may select break points having the highest confidence value for use as breaks. The content-owning user may be able to select or enter parameters for the automatic selection by the break selector 146. For example, the user may specify the total number of sponsored items that are to be included as midroll content (which may be the same as the total number of breaks) and/or specify that breaks be farther apart in time than a threshold duration.

Figure 2B:
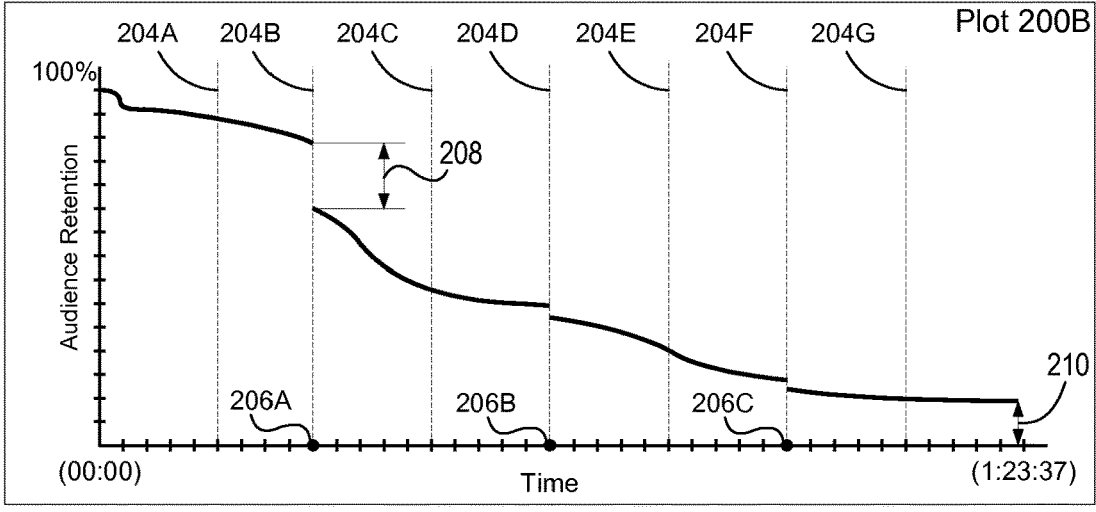
FIG. 2B illustrates an exemplary plot of audience retention values of a primary media item including midroll content, in accordance with some embodiments of the disclosure.

Referring to FIG. 2B, shown therein is a plot 200B. The plot 200B is a graph showing audience retention values over time. Plot 200B also illustrates a set of candidate break points 204A-G, identified by the break candidate identifier 144, as dashed lines intersecting the time axis of the plot. The candidate break points 204A-G may be provided to the break selector 146, which selects breaks from among them. As shown in FIG. 2B, the break selector 146 selects candidates break points 204B, 204D, and 204F for the locations of breaks 206A, 206B, and 206C, respectively. During the presentation of the media item, midroll content is presented at breaks 206A, 206B, and 206C. For example, the midroll content may be a sponsored media item obtained from the sponsored content server 160.

As illustrated in FIG. 1, the sponsored content server 160 includes a sponsored content store 162 that contains sponsored items 164A-N. The sponsored items 164A-N may be content items, previews, announcements, or other media items for which a fee is paid for presentation to users of the content-sharing platform 130. When a media item is played on a client device 110A, the client device 110A may be provided with instructions to fetch a portion of the media item, and then to fetch a sponsored item at the break. The client device 110A may communicate with both the content-sharing platform 130 and the sponsored content server 160 in order to receive data for the media item and one or more of the sponsored items 164A-N for display at the break. For example, upon requesting to view a media item, a manifest file may be sent to the client device 110A that includes links or references to the media item and indicates that at specific times in the presentation of the media item (e.g., at the breaks), sponsored items should be accessed using other links provided in the manifest file. Thus, as shown in FIG. 2B, during the presentation of the media item, one of sponsored items 164A-N is presented at each of the breaks 206A-C.

As described herein, the inclusion of midroll content at one or more breaks in the presentation of a media item may impact certain measures of the performance of the media item. For example, if a break is set such that midroll content is presented in the middle of a car chase in an action movie, the user may become frustrated and stop watching the action movie, thereby decreasing the opportunities to present sponsored items. As shown in FIG. 2B, the plot 200B registered a drop in audience retention values coinciding with each of the breaks 206A-C at which midroll content is presented. While the drop in audience retention values associated with breaks 206B and 206C is relatively small, the drop 208 is more substantially. As illustrated in FIG. 2B, the decrease in audience retention shown by drop 208 (coinciding with the break 206A) is about 20%. The end value 210 also is significantly impacted.

The data shown in plot 200B and other information may be provided to a feedback system 148 of the sponsored content placement system 142. The feedback system 148 uses the information of plot 200B, and/or additional information, to determine an adjustment to the breaks 206A-C. The feedback system 148 may use the information to select break 206A for adjustment using audience retention drop as a decision criterion. Other criteria may be used in other embodiments. Using information regarding the media item and information regarding the break 206A and the sponsored item presented at the break 206A, the feedback system 148 may determine to adjust break 206A by moving it from the candidate break point 204B to the candidate break point 204A, which occurs at a different time (i.e., earlier) in the presentation of the media item.

In some embodiments, when the drop associated with a break, such as break 206A exceeds a threshold, the sponsored content placement system 142 may determine an adjustment to make. The adjustment may be the removal of the break, the relocation of the break in the presentation of the media item, and/or the replacement of the content presented during the break in the media item. The sponsored content placement system 142 may identify the location of the break and the closest candidate break points. As illustrated in FIG. 2B, the closest candidate break points to break 206A are candidate break points 204A and 204C. In selecting between the candidate break points 204A and 204C, the sponsored content placement system 142 may use the proximity to the break 206A as a determining factor. Thus, because the candidate break points 204A is closer to break 206A, the sponsored content placement system 142 may adjust the break 206A by moving it to the time of the candidate break points 204A or the sponsored content placement system 142 may recommend such an adjustment to the user that owns the media item.

In some embodiments, the slope of the audience retention values line may be used to determine the adjustment to make to break 206A. For example, the slope of the audience retention values line has a greater negative value around the candidate break point 204A than around the candidate break point 204C, which may indicate that the loss of viewing users would be less if break 206A is moved to the time of candidate break point 204A.

In yet other embodiments, the sponsored content placement system 142 may determine to move the break 206C from the time of candidate break point 204F to the time of candidate break point 204E when information indicates that click-through-rates of content presented at break 206C fall below a threshold value. In some embodiments, multiple factors like audience retention values, click-through-rates, proximity of candidate break points, and confidence values for candidate break points may be included in the determination of the adjustment to any given break by the sponsored content placement system 142.

In some embodiments, the adjustment to break 206A is presented to the user that owns the media item as a recommendation that the user may confirm to accept. The adjustment is then performed by the break selector 146. The adjustment may be observed in plot 200C of FIG. 2C. Plot 200C is a graphical representation of the audience retention values of the media item when the breaks 206A-C are positioned at the candidate break points 204A, 204D, and 204F. As compared with the audience retention values of plot 200B, the drop that coincides with the break 206A is smaller. Thus, the drop 212, which as illustrated is about 8%, is smaller than the drop 208, which occurred when break 206A occurred at the time of the candidate break point 204B. The adjustment associating the break 206A with the candidate break point 204A may result in a decrease in the associated drop, which in turn may result in a higher end value 214. This means that more users view the media item in its entirety.

Figure 3:
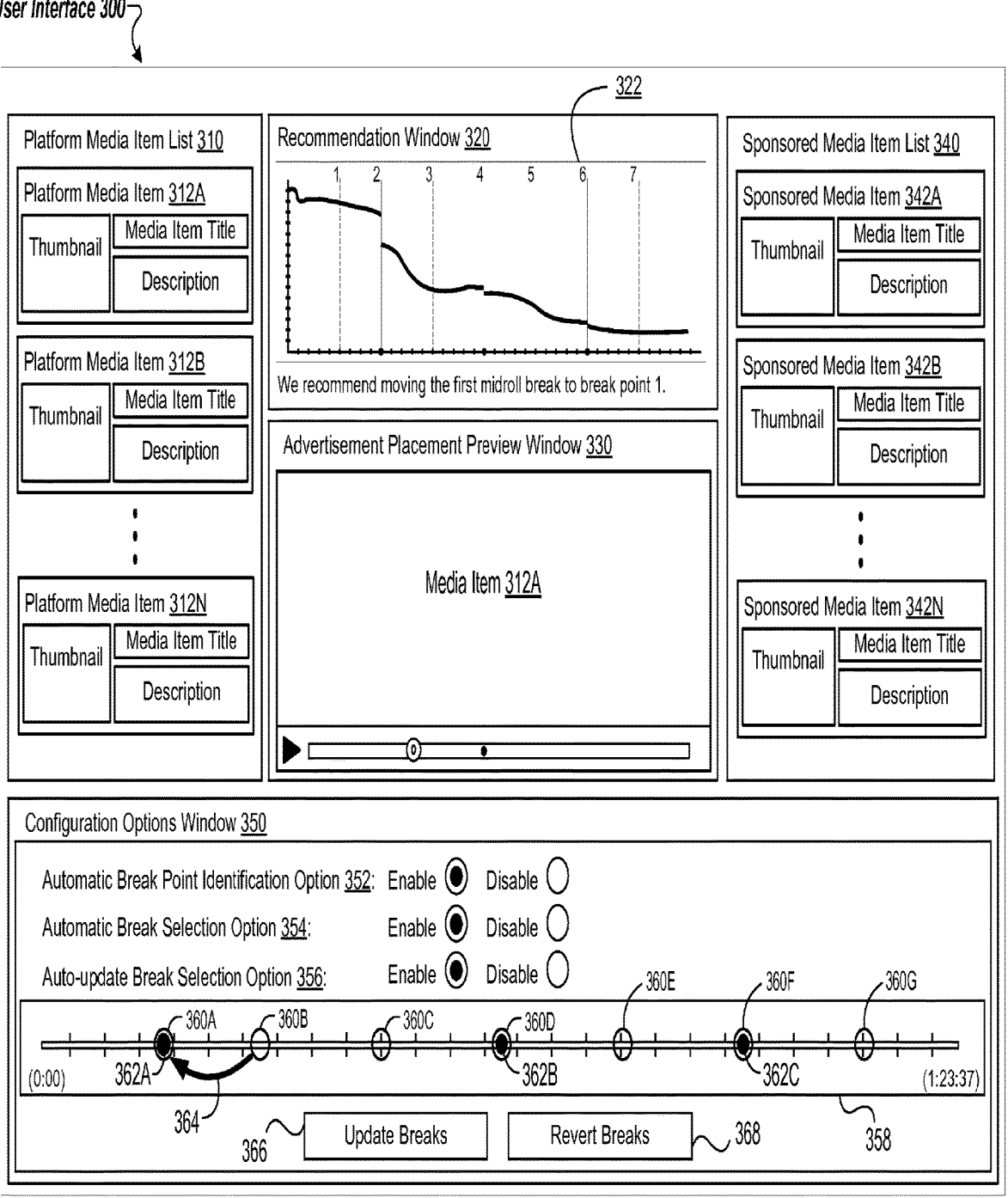
FIG. 3 is an exemplary user interface facilitating midroll break placement optimization, according to some embodiments of the disclosure.

FIG. 3 depicts an exemplary user interface 300, which may be provided to a content-owning user in the management of one or more media items. As illustrated, the user interface 300 is a graphical user interface that includes several smaller fields or windows. Not all of the windows shown as included in the user interface 300 may be present in all embodiments. Similarly, some embodiments of the user interface 300 may include additional windows. The user interface 300 may be provided as instructions from the content-sharing platform 130, transmitted over the network 120 to the client devices 110A-N.

As illustrated, the user interface 300 includes a platform media item list 310, which lists media items that the content-owning user has on the content-sharing platform 130. As depicted, each of the platform media items 312A-N includes a thumbnail image of the media item, as well as a title and a description of the media item. These features may aid the content-owner in selecting a media item. After selecting one of the media items 312A-N from the platform media item list 310, the user may be presented with a recommendation window 320. The recommendation window 320 may provide information upon which the user may adjust the breaks or information upon which the feedback system 148 of the sponsored content placement system 142 may provide adjustment recommendations and determine adjustments to the breaks. In the illustrated embodiment, the recommendation window 320 includes a plot 322 similar to the plot 200B of FIG. 2C. The recommendation window 320 may also include a text-based recommendation to communicate to the user the recommended break adjustment ("We recommend moving the first midroll break to break point 1").

The user interface 300 also includes a content item placement preview window 330, which may play the selected media item (as illustrated, media item 312A) to allow the user to preview any adjustment made to the break or breaks. As illustrated, the user interface 300 also includes a sponsored media item list 340 that lists sponsored media items 342A-N that may be presented at the breaks set for the media item 312A. This may permit the user to more accurately assess how the media item 312A is to be presented to consuming users of the content-sharing platform 130.

Additionally, the user interface 300 includes a configurations options window 340 to permit a content-owning user to select various configuration options for application in the adjustment of pre-selected break points. As illustrated, the configuration options window 350 includes an automatic break point identification option 352. The break point identification option 352 includes radio buttons or may include other user interface features to permit the user to enable or disable the automatic break point identification that may be provided by the break candidate identifier 144 of the sponsored content placement system 142. By enabling the break point identification option 352, the break candidate identifier 144 may scan and analyze uploaded media items to identify candidate break points as described herein.

The configurations options window 350 also includes an automatic break selection option 354, which the user may enable or disable. When the break selection option 354 is enabled by the user, the break selector 146 of the sponsored content placement system 142 may receive candidate break points from the break candidate identifier 144 and select a subset of the candidate break points as breaks for the inclusion of midroll content.

An auto-update break selection option 356 may permit the user to enable or disable automatic updating of the midroll break based on information collected regarding the media item and regarding the pre-selected or previously selected breaks. By enabling the auto-update break selection option 356, the feedback system 148 may determine an appropriate adjustment to one or more of the previously selected breaks and then perform the adjustment. When the auto-update break selection option 356 is disabled, the feedback system 148 may not perform the adjustments or may direct the candidate selector 146 not to perform the adjustments until the user confirms or otherwise accepts the recommended break adjustment.

The configuration options window 350 also includes a media item time line 358 that displays candidate break points 360A-G and displays the recommended breaks 362A, 362B, and 362C, along with an adjustment indicator 364 that graphically shows the user the recommended adjustment to the first break. To enable a user to accept or confirm the recommended adjustment, the configuration options window 350 includes an update button 366, by which the user may confirm the update and request its implementation, and a decline or revert button 368, by which the user may decline the recommended adjustment. In accepting the recommended adjustment to move the break 362A, either by manually selecting the update button 366 or by enabling the auto-update break selection option 356, the sponsored content placement system 142 may perform adjustments to previously-selected breaks. The adjustments to the break or to several breaks may improve the experience of consuming users of the content-sharing platform 130, such that more users view the entirety of the media item and view more sponsored items.

FIG. 4 is a flow diagram of a method 400 of incorporating feedback into break point placement to dynamically update break point locations, according to some aspects of the present disclosure. The method 400, and other methods described herein, may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 400 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

In one embodiment, method 400 may be performed by the sponsored content placement system 142 of the content-sharing platform 130 as shown in FIG. 1. In some embodiments, one or more of the operations of the method 400 may be performed other features of the by the content-sharing platform 130 or by features similar to those of the sponsored content placement system 142, but executing on the client devices 110A-N.

Embodiments of the method 400 may begin at block 402 in which processing logic identifies a break in a media item. The processing logic can identify a plurality of candidate break points in the media item. The break may be associated with a first break point of a plurality of candidate break points. The first break point can be at a first time during playback of the media item. For example, the sponsored content placement system 142 may receive information identifying break 206A as shown in plot 200B of FIG. 2B. Break 206A occurs at a point in the media item that corresponds to a candidate break point 204B. The break selector 146 may provide information regarding the break 206A to the sponsored content placement system 142.

Figure 2C:
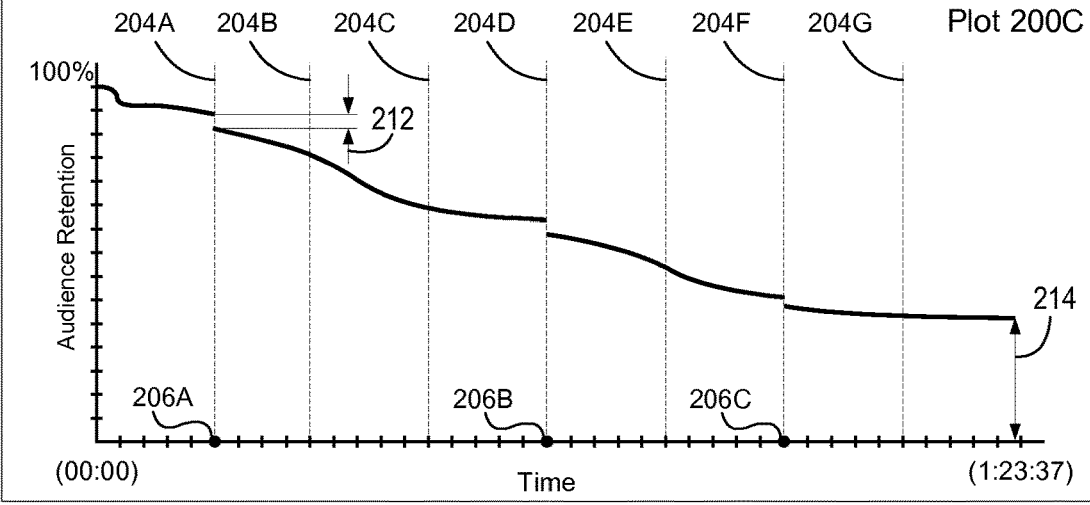
FIG. 2C illustrates an exemplary plot of audience retention values of a primary media item including midroll content after placement optimization, in accordance with some embodiments of the disclosure.

At block 404, the processing logic collects information regarding the media item and regarding the performance of content played during the break at the first time in the media item. The feedback system 148 of the sponsored content placement system 142 may collect many kinds of information regarding the media item, the break, and the content presented at the break. For example, the information may include an identification of a number of client devices that received the media item before the break and an identification of a number of client devices that received the media item after the break. The processing logic can calculate audience retention values as seen in plots 200A and 200B of FIGS. 2A and 2B based on the number of client devices receiving the media item before and after the break. The audience retention values may include absolute values in terms of the actual number of client devices that reached a specific time in the media item. The audience retention values may include values relative to the media item itself (as shown in FIGS. 2A-C), or the audience retention values may be expressed relative to an average of media items of similar duration that have been consumed by users of the content-sharing platform 130. Audience retention values may be presented according to the way in which a client device exits the media item, whether by closing a media viewer 112 being used to play the media item or by navigating away from the media item in the media viewer 112. Other information may include content item metrics, such as impressions, full length views, click-through-rates and information regarding how a content item included as midroll content performs when presented in at a break during the presentation of other media items. Content item characteristics may be included when the midroll content presented at the break is a content item. Such characteristics may include a duration of the content item, a type of product presented by the content item, etc. Additionally, all of the set of candidate break points and their associated confidence values may be presented to the feedback system 148 for use in analyzing the existing breaks to determine whether and what adjustments are appropriate.

In additional embodiments, the comments submitted by users of the content-sharing platform 130 in associated with the media item may be analyzed. For example, if users complain in the comments about the placement of one or more breaks or about the content played at the one or more breaks, that information may be provided to the feedback system 148. The nature of the comment, the time at which the comment is made, and/or the point in the presentation of the media item at which the comment is made may be provided for use by the sponsored content placement system 142. In further embodiments, results from comparison tests may be provided to the feedback system 148. For example, in order to assess the effectiveness of candidate break points, one set of breaks may be used when presenting a media item to some users, while another subset of breaks may be used when presenting the media item to other users. The performance data for both subsets may be provided and compared by the feedback system 148.

In situations in which the systems discussed here collect personal information about users from the users or from users' devices, or make use of personal information, the users may be provided with an opportunity to control whether the content-sharing platform 130 collects user information (e.g., information about a user's social network, social actions or activities, profession, a user's preferences, a user's current location, or a user's consumption history), or to control whether and/or how to receive content from the content-sharing platform 130 that may be more relevant to the user. In addition, certain data may be treated in one or more ways before it is stored or used, so that personally identifiable information is removed. For example, a user's identity may be treated so that no personally identifiable information can be determined for the user, so that a particular user cannot be determined. Thus, the user may have control over how information is collected about and from the user and used by the content-sharing platform 130.

At block 406, the processing logic determines an adjustment or adjustments to the break based on the collected information. The processing logic can determine a different in the number of client devices that received the media item before the break and the number of client devices that received the media item after the break. The processing logic can compare the difference in the number of client devices receiving the media item before and after the break to a retention threshold to determine whether the break should be adjusted and moved to another of the plurality of candidate break points. For example, if the difference in the number of client devices receiving the media item before and after the break is above the retention threshold, the processing logic can determine that the break should be removed or adjusted to another of the plurality of candidate break points. In some cases, the sponsored content placement system 142 can determine rates of change before and after the break. For example, rather than measuring the retention rate just prior to the break and just after the break, the sponsored content placement system 142 can measure the number of connected client devices at a plurality of time points prior to the break and a plurality of time points after the break. Based on the number of connected client devices at the different time point before and after the break, the sponsored content placement system 142 can calculate rates of change before and after the break. The sponsored content placement system 142 can adjust the break to a different of the plurality of candidate break points if the difference in the rate of change before and after the break is above a predetermined threshold. Adjustments of the break may include selecting a new candidate break point as the new location of the break, such as an automatically selected break point used for a break. In some embodiments, an adjustment may be a deletion of a break without moving the break to a different candidate break of the media item. The determined adjustment may be provided as a recommendation to an owner of the media item or may be automatically used, based on the user's prior agreement (such as by the auto-update break selection option 356 in user interface 300 of FIG. 3).

At block 408, the sponsored content placement system 142 may perform the adjustment. Thereafter, the break may be presented at the time associated with the newly selected candidate break point rather than at the time associated with the original candidate break point. As discussed, in some embodiments the adjustment may be to remove the break from a time indicated by a candidate break point without moving the break to another time.

In some cases, the processing logic can select different candidate break points as the location for the break for different client devices. Based on the interaction of the client device with previous media items or the client device type, the sponsored content placement system 142 can select a different candidate break point for different types of client devices. For example, sponsored content placement system 142 can determine that the time between breaks should be longer for first type of client device, such as a web-connected television, when compared to a second type of client device, such as a smart phone.

The method 400 may enable previously selected breaks to be used in the collection of information, based upon which different breaks may be selected. Because of the collected information, the more recent breaks may perform better than the previously selected breaks. When the new breaks do not perform better than the old breaks, the old breaks may be automatically restored by the sponsored content placement system 142.

FIG. 5 illustrates a diagrammatic representation of a machine in the exemplary form of a computer system 500 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like, having one or more cores. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein. For example, the processor 502 may execute instructions 526 to perform method 400 as shown herein in FIG. 4. In some embodiments, the processor 502 may execute the instructions 526 to provide the sponsored content placement system 142 as seen in FIG. 1, as well as subsystems and components thereof.

The computer system 500 may further include a network interface device 522. The network interface device 522 may include a plurality of network interface components, with each components being adapted for different modes of communication. For example, the network interface components may include an 802.11 transceiver, a Bluetooth® transceiver, and an interface for communicating with one or more cellular networks. The computer system 500 also may include a video display unit 510 (e.g., a liquid crystal display (LCD), a cathode ray tube (CRT), or a touch screen), an alphanumeric input device 512 (e.g., a physical keyboard or a virtual keyboard), a cursor control device 514 (e.g., a mouse or touch-screen sensor system), and a signal generation device 520 (e.g., a speaker).

The data storage device 518 may include a non-transitory computer-readable storage medium 524 on which is stored one or more sets of instructions 526 (e.g., software) embodying any one or more of the services, methodologies, or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 528 via the network interface device 522.

In one embodiment, the instructions 526 include instructions for a media providing a media item storage, a user service, a sponsored content placement system, a media viewer or other features which may correspond, respectively, to identically-named counterparts described with respect to FIGS. 1 and 3, and/or a software library containing methods for optimizing the placement of breaks in media items when the users consume media items. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
accessing, by a processor of a content server, a media item comprising visible content;
identifying, by the processor using a machine learning algorithm, a plurality of candidate break points in the media item, wherein the machine learning algorithm produces a plurality of confidence values respectively associated with the plurality of candidate break points, and wherein each confidence value indicates a likelihood that the corresponding candidate break point is an appropriate location for inclusion of a content item;
selecting, by the processor from the plurality of candidate break points, a break point in the media item, the break point being associated with a first point in time within the media item;
providing the media item to a plurality of devices, wherein each of the plurality of devices presents (i) the media item and (ii) the content item at the first point in time within the media item during playback of the media item;
after providing the media item to the plurality of devices, determining, by the processor based on data indicating how the media item and the content item are viewed by users when presented via the plurality of devices, to adjust the break point from the first point in time to a second point in time within the media item, wherein the second point in time is different from the first point in time;
adjusting, by the processor, a position of the break point from the first point in time to the second point in time; and
after adjusting the position of the break point, providing the media item to an additional device, wherein the additional device presents (i) the media item and (ii) the content item at the second point in time within the media item during playback of the media item.

2. The computer-implemented method of claim 1, wherein adjusting the position of the break point comprises:
selecting, by the processor from the plurality of candidate break points, a second break point that aligns with the second point in time.

3. The computer-implemented method of claim 1, wherein determining to adjust the break point in the media item comprises:
determining, by the processor based on the data indicating how the media item and the content item are viewed by users when presented via the plurality of devices and the plurality of confidence values respectively associated with the plurality of candidate break points, to adjust the break point from the first point in time to the second point in time within the media item, wherein the second point in time is different from the first point in time.

4. The computer-implemented method of claim 1, wherein identifying the break point in the media item comprises:
identifying, by the processor using the machine learning algorithm, a scene change in the media item.

5. The computer-implemented method of claim 1, wherein identifying the break point in the media item comprises:
identifying, by the processor using the machine learning algorithm, a break in dialogue in the media item.

6. The computer-implemented method of claim 1, wherein adjusting the position of the break point comprises:
after determining to adjust the break point, automatically adjusting, by the processor, the position of the break point.

7. The computer-implemented method of claim 1, wherein adjusting the position of the break point comprises:
presenting, via an electronic device of a user, an indication of an adjustment to the break point in the media item;
receiving, via the electronic device, an acceptance to adjust the break point; and
after receiving the acceptance to adjust the break point, adjusting the position of the break point.

8. A system for managing break points in a media item, the system comprising:
a memory storing data associated with a machine learning algorithm; and
at least one processor interfacing with the memory and configured to:
access the media item comprising visible content,
identify, using the machine learning algorithm, a plurality of candidate break points in the media item, wherein the machine learning algorithm produces a plurality of confidence values respectively associated with the plurality of candidate break points, and wherein each confidence value indicates a likelihood that the corresponding candidate break point is an appropriate location for inclusion of a content item,
select, from the plurality of candidate break points, a break point in the media item, the break point being associated with a first point in time within the media item,
provide the media item to a plurality of devices, wherein each of the plurality of devices presents (i) the media item and (ii) a content item at the first point in time within the media item during a playback of the media item,
after providing the media item to the plurality of devices, determine, based on data indicating how the media item and the content item are viewed by users when presented via the plurality of devices, to adjust the break point from the first point in time to a second point in time within the media item, wherein the second point in time is different from the first point in time, adjust a position of the break point from the first point in time to the second point in time, and after adjusting the position of the break point, provide the media item to an additional device, wherein the additional device presents (i) the media item and (ii) the content item at the second point in time within the media item during playback of the media item.

9. The system of claim 8, wherein to adjust the position of the break point, the at least one processor is configured to:

select, from the plurality of candidate break points, a second break point that aligns with the second point in time.

10. The system of claim 8, wherein to determine to adjust the break point in the media item, the at least one processor is configured to:

determine, based on the data indicating how the media item and the content item are viewed by users when presented via the plurality of devices and the plurality of confidence values respectively associated with the plurality of candidate break points, to adjust the break point from the first point in time to the second point in time within the media item, wherein the second point in time is different from the first point in time.

11. The system of claim 8, wherein to identify the break point in the media item, the at least one processor is configured to:

identify, using the machine learning algorithm, a scene change in the media item.

12. The system of claim 8, wherein to identify the break point in the media item, the at least one processor is configured to:

identify, using the machine learning algorithm, a break in dialogue in the media item.

13. The system of claim 8, wherein to adjust the position of the break point, the at least one processor is configured to:

after determining to adjust the break point, automatically adjust the position of the break point.

14. The system of claim 8, wherein to adjust the position of the break point, the at least one processor is configured to:

present, via an electronic device of a user, an indication of an adjustment to the break point in the media item, receive, via the electronic device, an acceptance to adjust the break point, and after receiving the acceptance to adjust the break point, adjust the position of the break point.

* * * * *